UNITED STATES PATENT OFFICE.

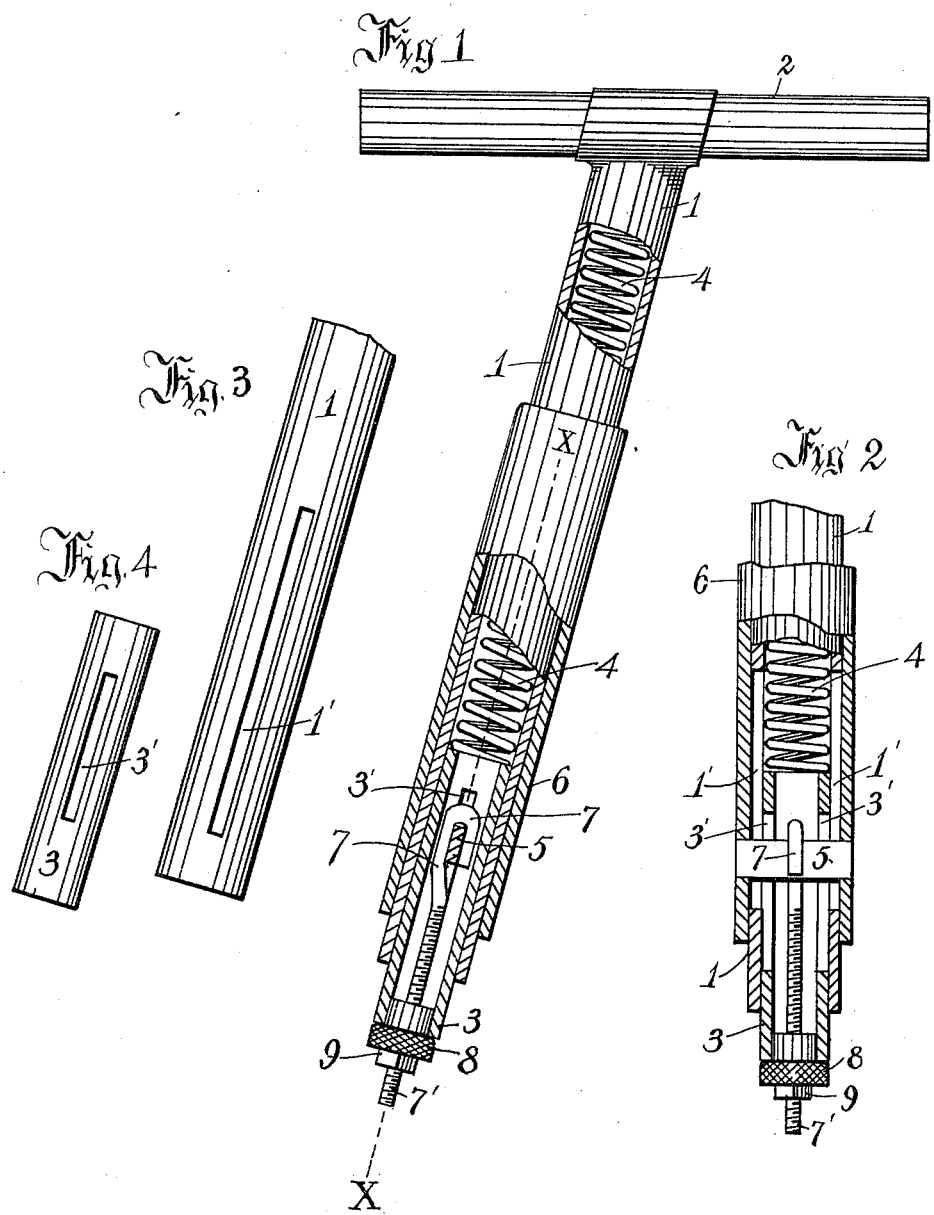

OSCAR F. REEVES, OF SAGINAW, MICHIGAN.

SPRING SADDLE-POST.

SPECIFICATION forming part of Letters Patent No. 600,377, dated March 8, 1898.

Application filed November 23, 1896. Renewed December 13, 1897. Serial No. 661,760. (No model.)

*To all whom it may concern:*

Be it known that I, OSCAR F. REEVES, a citizen of the United States, residing at Saginaw, in the county of Saginaw and State of Michigan, have invented a certain new and useful Spring Saddle-Post for Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention is a spring saddle-post for bicycles. Heretofore it has been common in manufacturing springs for bicycle saddle-posts to place the spring below the post or surrounding a stem of the post.
My invention consists of placing a spring within a hollow saddle-post, and properly supported therein, and providing means of adjustment whereby the tension of the spring may be varied according to the weight of the rider.

I am not aware that a bicycle saddle-post has been so constructed, and therefore claim, broadly, any means of placing and securing a spring within a saddle-post.
My invention also contemplates certain minor novel features of construction, such as the preventing of the rotation of the post and the arrangement of several parts of the device, whereby it is made simpler, more durable, and otherwise better adapted for use.

Figure 1 is a side elevation, in part sectional, of my spring saddle-post. Fig. 2 is a sectional view on line X X of Fig. 1. Fig. 3 is a side view of the lower part of the post.
Fig. 4 is the same view of the spring-support.

In the drawings, 1 is the saddle-post, and consists of a long hollow tube having upon the upper part thereof the cross-bar 2, which may be integral therewith.
1' is a vertical slot extending through the post on both sides thereof, and through this slot the pin 5, hereinafter described, passes. The slot is for the purpose of allowing the post to move up and down as the spring is depressed.

3 is the spring-support, fitting in the lower end of the post, and may be a hollow tube, as shown. Upon the upper end of this support 3 rests the spring 4, fitting in the post between the spring-support and the upper end of the post. The spring-support 3 has also a vertical slot 3' extending entirely through the tube, and through this slot the pin 5 also passes, as shown in Fig. 2.

6 is a casing fitting the outside of the post and shorter than the post and adapted to pass within the socket of a bicycle-frame and be clamped therein. Passing directly through the casing and secured therein is the pin 5. When the parts 1, 3, and 6 are placed in position, the slots 1' and 3' will be in line, and through these slots the pin 5 is passed and secured in the outside casing 6. The tube 3 will then have a vertical movement in the post the length of the slot 3', and the post 1 will have a movement in the casing the length of the slots 1', thus allowing the spring to be depressed the distance between the top of the pin 5 and the top of the slot 1', which is the limit of the movement of the post.

In order that the tension of the spring may be adjusted, I provide a hook 7, engaging the pin 5 inside of the spring-support 3, provided with the depending threaded end 7', provided with a milled nut 8, which is larger than the tube or support 3, whereby when the nut 8 is turned upward on the end 7' the tube 3 will be pressed upward in the post 1, the limit of its movement upward being the length of the slots 3'. It will thus be seen that by turning the nut 8 up or down the tension of the spring will be increased or diminished.

9 is a jam-nut below the nut 8 on the end 7' and holds the spring-support 3 in the position in which it may have been adjusted.

When these parts are collected and arranged as described and illustrated, the post is in condition to be attached to a bicycle-frame, which is done by taking out the ordinary saddle-post and inserting this post and casing in place thereof and clamping it therein in the usual manner. The height of the saddle is adjusted in the same manner as with the ordinary saddle-post—viz., by clamping the casing 6 in the proper position in the bicycle-frame.

In order to adjust the spring to different weights or to take up the tension of the spring, the device must be removed from the frame and the milled nut 8 turned as described and then replaced in the frame.

It is evident from the above description of my invention that the same is susceptible of modification in its means of adjustment without materially departing from the principle of my invention, and therefore I do not wish to limit myself to the exact form and means illustrated and described.

Having thus described my invention, what I claim as new, and desire to secure by Letters Patent, is—

1. A spring saddle-post for bicycles, comprising a hollow post, a spring fitting inside the post, a support for the spring in lower end of the post, a casing for the post fitting the bicycle-frame, a pin passing through the casing and through slots in the post and the spring-support, and means as described for adjusting the spring.

2. A spring saddle-post for bicycles, comprising a hollow saddle-post having at its upper end a cross-bar, and in its lower end a tube supported on a pin passing through slots in the post and tube and secured in a casing on outside of post, a spring fitting the hollow post above the tube and resting upon it, a casing for the post fitting the bicycle-frame and containing the pin passing through the post, whereby the post is held from rotation, a hook passing within the tube and engaging the pin, a milled nut on the lower end of the hook and larger than the tube, whereby by turning up the nut the tube will be forced up the hollow post and the tension of the spring thereby varied, as described.

3. In a spring-post for bicycle-saddles, comprising a hollow post containing a spring, the means for supporting and adjusting the spring and post, comprising a casing for the post, a pin secured in the casing and passing through vertical slots in the saddle-post and in a tube in lower end of post, and thereby supporting the spring, a hook engaging the pin within the tube, a nut on the lower end of the hook larger than the tube, whereby by turning up the nut the tube will move on the pin and compress the spring, and vice versa, as described.

4. In a bicycle-saddle spring-post, the combination with a hollow saddle-post provided with two vertical slots in line, a casing fitting the bicycle-frame, and the means for securing it to the frame, of a spring in the hollow post, a tube in the lower end of the post abutting the spring and having two vertical slots in line, a pin passing through the casing, post, and tube in the slots therein, thereby holding the tube and spring in the post, a hook engaging the pin within the tube and having a depending threaded end provided with a milled nut larger than the tube, whereby the tube and spring may be adjusted, and a jam-nut on the end of the hook, as described.

5. In a spring-post for bicycle-saddles, the combination with a hollow saddle-post and a casing surrounding the hollow saddle-post, of a spring in the hollow saddle-post, and a pin passing through the casing and post below the spring through vertical slots in the post, as described.

In testimony whereof I hereunto affix my signature in the presence of two witnesses.

OSCAR F. REEVES.

Witnesses:
A. H. SWARTHOUT,
FANNIE ROBBINS.